United States Patent [19]

Maruyama

[11] Patent Number: 5,818,833
[45] Date of Patent: Oct. 6, 1998

[54] PERSONAL COMMUNICATION DEVICE USABLE IN TWO COMMUNICATION MODES AND PERSONAL TELECOMMUNICATION SYSTEM INCLUDING THE DEVICE

[75] Inventor: Kazuhiko Maruyama, Tokyo, Japan

[73] Assignee: Mitsubishi Denki Kabushiki Kaisha, Tokyo, Japan

[21] Appl. No.: 701,478

[22] Filed: Aug. 22, 1996

[30] Foreign Application Priority Data

Aug. 24, 1995 [JP] Japan ................................. 7-215602

[51] Int. Cl.⁶ .................................................. H04Q 3/00
[52] U.S. Cl. ........................ 370/352; 370/349; 370/437; 455/33.1
[58] Field of Search ..................... 370/351, 352, 370/353, 363, 398, 412, 420, 422, 428; 455/31.1, 33.1, 74, 78, 89, 101

[56] References Cited

U.S. PATENT DOCUMENTS

| | | | |
|---|---|---|---|
| 4,914,714 | 4/1990 | Tamura | 455/78 |
| 5,247,700 | 9/1993 | Wohl et al. | 455/33.1 |
| 5,257,397 | 10/1993 | Barzegar et al. | 455/33.1 |
| 5,471,473 | 11/1995 | Tejima | 370/431 |

FOREIGN PATENT DOCUMENTS 95 07595  3/1995  WIPO .............................. H04Q 7/32

*Primary Examiner*—Hassan Kizou
*Assistant Examiner*—A. Bnimoussa

[57] ABSTRACT

Both call switching communication and packet communication are achieved by one personal communication device. Misreceiving in the personal communication device usable in two communication modes is prevented. The personal communication device has a call switching modem and a packet switching modem. The former is used for AMPS network, and the latter for CDPD network. A telecommunication system includes a transmission/receiving terminal and a telecommunication network. The packet switching modem of the terminal awaits the receiving and initial transmission. In this system, the transmission terminal first sends a CDPD packet to the receiving terminal. The receiving terminal is informed of a request for call switching communication. The receiving terminal sends back a response to the request as a CDPD packet, and then a call in the AMPS network is made. Although the personal communication device is usable in the two modes, misreceiving does not occur because awaiting is in a fixed mode.

12 Claims, 12 Drawing Sheets

PERSONAL COMMUNICATION DEVICE USABLE IN TWO COMMUNICATION MODES AND PERSONAL TELECOMMUNICATION SYSTEM INCLUDING THE DEVICE

BACKGROUND OF THE INVENTION

1. Field of the Invention

The present invention relates to a personal communication device and a personal telecommunication system including this personal communication device. The present invention particularly relates at least to a personal communication device used for voice communication in a call switching communication system and a personal telecommunication system including the personal communication device.

2. Description of the Prior Art

Many kinds of personal communication devices, such as cellular phones and pagers, have been developed and commercially available. Many personal communication devices with an improved or expanded function are proposed. The progress in personal communication is accompanied with improvement of an infrastructure including telecommunication stations and a telecommunication network, as well as in communication devices. Furthermore, this progress can promote improvement of a telecommunication related technology.

Japanese Patent Laid-Open Publication No. Hei 3-32236 discloses an example of the improvement. This technology provides a telecommunication system for a moving body, in which the features of a large zone system and that of a small zone system are combined. The telecommunication system has the following features:

(1) When dialing a movable communication device from a telephone, a call station calls the communication device in a large zone system.

(2) When the movable communication device confirms the receiving of a call, it automatically transmits a call back to the telephone via a connecting station disposed in a building or underground shopping center, in a small zone system.

(3) Subsequently, usual voice communication starts. In the movable communication device of a moving body, the small zone system is usually employed because the size of the movable communication device should be small. However, the power of the electromagnetic waves used in the small zone system is very small, occasionally preventing the movable communication device from being usable within a building that does not contain the small zone system. Therefore, an attempt to remove the restriction to the movable communication device has been made by employing the above described telecommunication system.

This movable communication device enables a reduced size and an expanded telecommunicable range. Although the technology proposed here can improve the telecommunication performance, it does not expand the communication function of a movable communication device.

SUMMARY OF THE INVENTION

The purpose of the present invention is to provide:

(1) a personal communication device for realizing expansion of the telecommunication function, and a system including an infrastructure (telecommunication network) for the personal communication device;

(2) a technology for realizing smooth cooperation of the personal communication device and the system in multiple operation modes.

A personal communication device provided by the present invention comprises a call switching communication section for providing a call switching communication mode, including voice communication, according to a call switching telecommunication method, a packet communication section for providing a packet communication mode by digital communication utilizing a packet telecommunication network, a radio communication section commonly used in these two communication modes, and a synthetical control section for synthetically controlling these two communication modes. The "call switching telecommunication method" enables voice communication, facsimile transmission and data communication on a usual telephone line. In the "call switching communication mode", a personal communication device provided by the present invention is operational for the call switching communication. In the "packet communication", data in a packet form are transmitted or received. In the "packet communication mode", a personal communication device provided by the present invention is operational for the packet communication.

In this preferred embodiment, the synthetical control section fixedly awaits the receiving in one of the two communication modes. According to the content of a received signal, the current communication mode can be changed into the other, if necessary. A single communication mode is used at an initial stage of telecommunication. This enables smooth cooperation in the call switching communication mode and packet communication mode, and prevents signals in either mode from being misreceived.

A personal telecommunication system provided by the present invention includes a transmission terminal, a receiving terminal and a telecommunication network. The telecommunication network may include telecommunication stations.

In a second embodiment, both of the transmission and receiving terminals have a personal communication device provided by the present invention. When the call switching communication is desired, the transmission terminal first transmits a request packet for the call switching communication (simply referred to as a "request packet" hereinafter) to the receiving terminal in the packet communication mode. The mode in the receiving terminal is changed into the call switching mode after receiving the request packet. The telecommunication is achieved in a single communication mode at the initial stage.

In a third combination, the transmission terminal is a personal communication device provided by the present invention, but the receiving terminal is a conventional device only usable in the call switching communication mode. The packet communication is not applicable to the receiving terminal. Therefore, telecommunication is achieved by the following procedure:

When the call switching communication is desired, a request packet is first transmitted to the telecommunication network. Subsequently, the telecommunication network calls the receiving terminal in the call switching communication mode. In this configuration, the telecommunication network converts the packet transmitted from the transmission terminal to a normal call for the receiving terminal.

In this configuration, users cannot recognize the conversion of the packet to a call signal, because the conversion is carried out in the telecommunication network. Power consumption in the telecommunication network is usually not a problem, being different from that in the terminals. The conversion in the telecommunication network is preferable in that sense.

In a fourth combination, the transmission terminal is a conventional one only usable in the call switching communication mode, and the receiving terminal is a device provided by the present invention. When the transmission terminal calls the receiving terminal in a conventional way, the communication network converts a call signal to a request packet, and then the packet is transmitted to the receiving terminal in the packet communication mode.

According to another aspect of a personal telecommunication system provided by the present invention, when the transmission and receiving terminals are usable in the packet and call switching communication modes, and the two terminals are used in the different communication modes, the telecommunication network appropriately converts a signal between the two communication modes.

DESCRIPTION OF THE PREFERRED EMBODIMENTS

EMBODIMENT 1

A personal communication device provided by the present invention will be described. This description is divided into three parts: 1. Preliminary explanation; 2. Hardware; and 3. Control of signal receiving operation.

1. Preliminary explanation

Recent personal communication devices occasionally have a call switching data communication function in addition to a usual voice communication function. In order to utilize an existing telephone network (for example, PSTN), data are frequency-modulated in the band of voice frequency. The NTT cellular phone network and AMPS cellular phone network can be used in Japan and the U.S., respectively.

A packet switching modem has not been disposed in a small personal communication device, such as a cellular phone, because a new infrastructure, as well as a radio transceiver specific to the packet switching modem, is necessary.

In 1994, a communication system called "Cellular Digital Packet Data" was introduced in the U.S., possibly changing the situation in the telecommunication field. In the CDPD system, packet data are transmitted at a high speed using a channel unused in the AMPS cellular phone network. Therefore, a radio transceiver in a personal communication device can commonly be used for AMPS communication without additional hardware.

The applicant has proposed a personal communication device having a call switching modem and packet switching modem in U.S. Ser. No. 08/591,133 taking the above points into consideration. In this specification, the proposed device will be called a "basic device" hereinafter.

2. Hardware

In this preferred embodiment, the basic device is employed. In the present invention, the call switching modem may be removed from the basic device, and the basic device without the call switching modem can be used only for voice communication and packet communication. This type of device will be described later.

Figure 1:
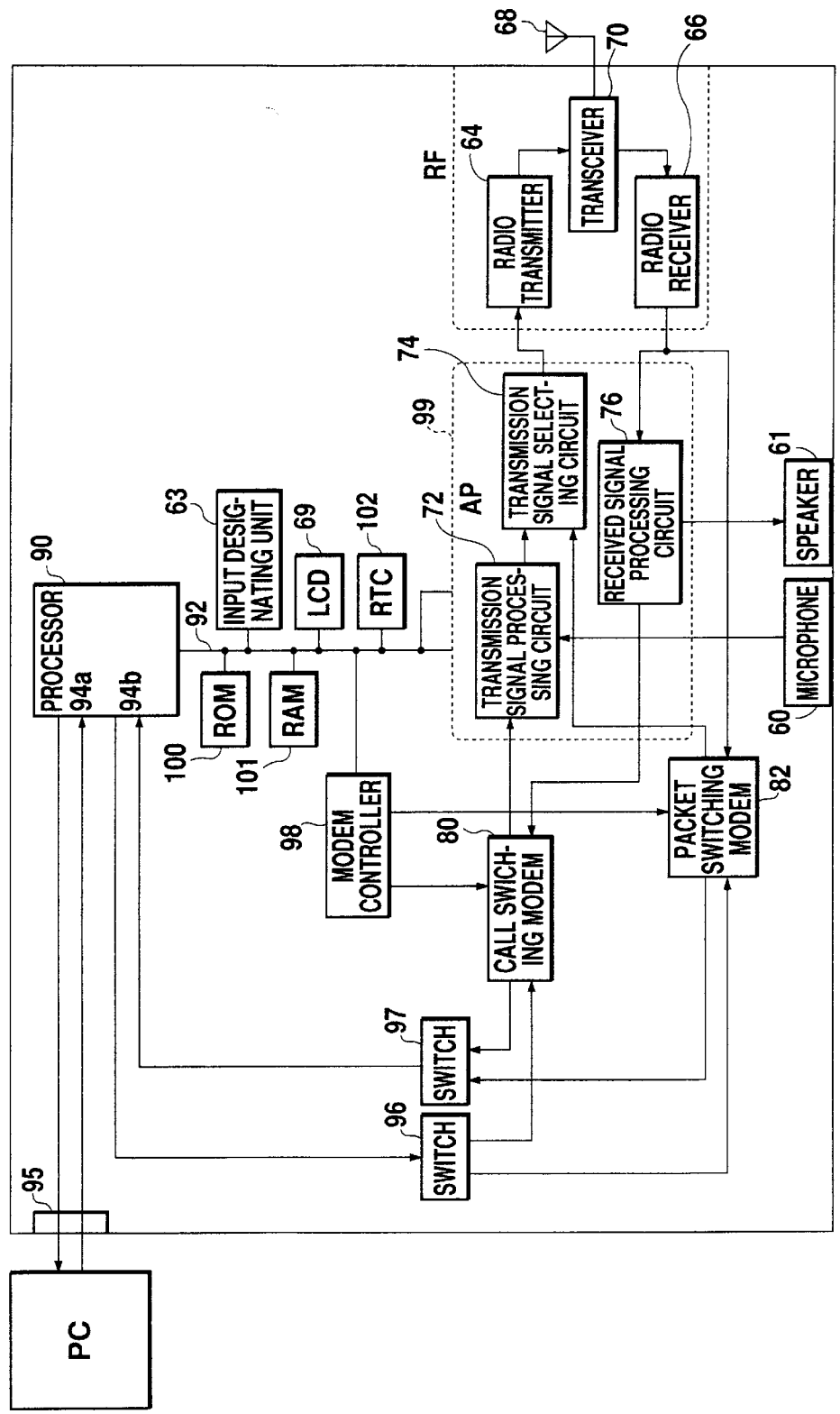
FIG. 1 shows the hardware structure of a personal communication device according to the first embodiment of the present invention.
Figure 2:
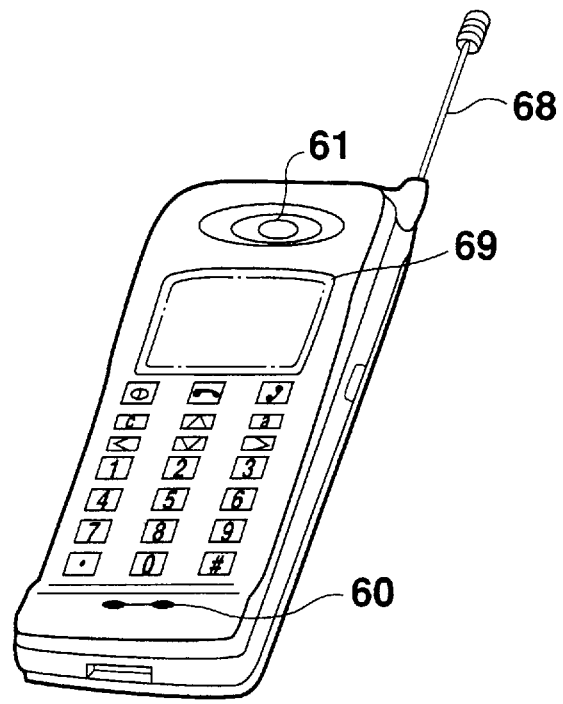
FIG. 2 shows the appearance of a personal communication device according to the first embodiment of the present invention.

The basic device is usable in a call switching communication mode, wherein the voice communication or call switching data communication is achieved, and in a packet communication mode. FIG. 1 shows the hardware structure of a personal communication device according to the first embodiment of the present invention. The appearance of the personal communication device is almost similar to that of a current cellular phone, as shown in FIG. 2. Functional blocks of the personal communication device will be described.

[1] Basic structure for realizing voice communication

A microphone 60 for inputting a users voice, a speaker 61 for outputting a voice of a person with whom the user talks, a radio transmitter 64 for transmitting a voice, a radio receiver 66 for receiving a voice, an antenna 68 for radio communication, a transceiver 70, a LCD 69 as a user interface, and ten keys assigned to 0 to 9 for inputting a telephone number are included. These ten keys are also used for inputting commands, and expressed as an input designating unit 63 in FIG. 1.

A voice base band signal inputted from the microphone 60 is subjected to band restriction processing in a transmission signal processing circuit 72. An analog signal generated within the voice frequency band is transmitted from the radio transmitter 64. A transmission signal selecting circuit 74 is disposed between the transmission signal processing circuit 72 and radio transmitter 64. This circuit selects a signal to be finally transmitted by radio, according to a transmission mode of the personal communication device, that enables transmission from a call switching modem 80 and a packet switching modem 82. When a voice is transmitted, the transmission signal selecting circuit 74 selects the path of the microphone 60, transmission signal processing circuit 72, and then radio transmitter 64. The transmission signal processing circuit 72 also performs the band restriction processing of a signal transmitted or received by the call switching modem. The AMPS network is employed as a line for the call switching communication. In order to get wider service in the U.S., another network than the AMPS may be used.

A received signal is sent into two parts, which are introduced to two receiving courses. One directly leads to the packet switching modem 82, the other leads to the speaker 61 and call switching modem 80 via a received signal processing circuit 76. The received signal processing circuit 76 performs processing, such as the band restriction, in order to remove noise in the received signal. The received signal is supplied to the two courses in parallel, and the device always awaits in the packet communication mode using the packet switching modem 82.

[2] Structure for realizing packet communication

A processor 90 for synthetically controlling this personal communication device, and a bus 92 connected to the processor 90 are essentially included. The processor 90 performs communication with serial data, and has two sets of input/output ports 94. In FIG. 1, the input/output ports 94a are connected to a connector 95 used for connecting an external PC or the like. RS-232C interface is used for connecting the external PC and connector 95. The input/output ports 94b is connected to the packet switching modem 82 via switches 96 and 97. This packet switching modem 82 digitally modulates serial data inputted to or outputted from the input/output ports 94b of the processor 90 in a frequency band beyond the voice frequency band, and demodulates a signal received by the radio receiver 66 to serial data. The GMSK modulation may be employed in this personal communication device. A modulated signal is transmitted from the radio transmitter 64, and supplied to the CDPD network. This enables the use of service as wide as in the existing AMPS communication. The person with whom the user talks is identified with an internet protocol (IP) number, rather than a usual telephone number.

A modem controller 98 synthetically controls and manages the condition and operation of the packet switching modem 82 and call switching modem 80 according to instructions from a modem driver. The transmission signal processing circuit 72, transmission signal selecting circuit 74 and received signal processing circuit 76 are integrated in an audio processor 99 (simply called "AP" hereinafter) of a single IC. The total size of the circuits is reduced by preventing the duplication of functionally common parts of the circuits.

Memories, in which several programs and data referred to by the processor 90 are stored, are connected to the bus 92. The memories are classified into two types. One is a ROM 100 storing a system program, and the other is a RAM 101 used as a work area. A program for the packet communication is stored in the ROM 100. This program includes the essential part of a TCP/IP task, CDPD control task and modem driver. The RAM 101 is also used for storing a user's telephone directory data and messages (packet communication subjects).

A real time clock (RTC) 102 is also connected to the bus 92. The RTC 102 is used for displaying the time, automatically transmitting a message at a predetermined time, and recording the time of receiving a message, as well as for measuring an interval to the next re-call, which will be described later.

The above structure can realize a bidirectional pager function for messages. When a CDPD base station provides a gateway function for the internet, a database connected to the internet can be accessed, and desired information can be obtained. In addition, even when the voice communication is not available, such as during a meeting, this structure can realize message communication.

[3] Structure for realizing call switching data communication

When this personal communication device is connected to a PC, it works as a call switching data communication device. The PC recognizes the personal communication device as a call switching modem having a RF function.

In order to realize the call switching data communication, this structure includes a circuit for RS-232C interface used for inputting data to, and outputting data from, the PC. Serial data inputted to or outputted from the input/output ports 94a of the processor 90 via the connector 95 come out at the input/output ports 94b through the inside of the processor 90. The outgoing serial data are supplied to the call switching modem 80 via the switches 96 and 97. The call switching modem 80 digitally modulates this serial data in the voice frequency band, and demodulates an analog signal received by the radio receiver 66 to serial data. QAM modulation is employed in this call switching modem 80, and the AMPS network is utilized. Therefore, the voice communication and call switching data communication are carried out in almost the same manner as far as the radio transmission and receiving are concerned.

3. Control of the receiving

The receiving operation of the personal communication device will be explained, including the reception waiting, actual reception, and mode switching. Details of the receiving operation are described in a later preferred embodiment.

[1] Awaiting of the receiving

In this personal communication device, the receiving is always awaited in the packet communication mode. Therefore, a calling terminal needs to call a personal communication device provided by the present invention in the packet communication mode. This requires the calling terminal to have a hardware similar to the personal communication device. The processing of a call from a terminal without any packet communication function (called a "conventional device" hereinafter) will be described later. Advantages of awaiting the receiving in a single communication mode are as follows:

(1) This personal communication device has only one radio transmission/receiving section due to the similarity between CDPD and AMPS. This does not basically permit the receiving to be simultaneously awaited in both packet communication mode and call switching communication mode. If the receiving is awaited in an arbitrary mode, and when the communication mode is different between the calling side and called side, the communication cannot be achieved. Such misreceiving can be prevented by predetermining the communication mode for the awaiting.

(2) While awaiting in the packet communication mode, the electric power supply to the hardware only necessary for the call switching mode can be cut. The recharging interval of a battery of this personal communication device can therefore be prolonged.

(3) While the packet communication is actually taking place, a request for the call switching communication can be received.

This personal communication device always begins to transmit in the packet communication mode in order to insure reception in the packet communication mode. The transmission at the beginning of communication is called "initial transmission" hereinafter.

[2] Identification of a received signal

Upon receiving a signal, this personal communication device identifies the content of the signal. The identification can be performed by cooperation of the packet switching modem 82 and the modem driver. For the identification, the signal must include identification information, by which three types of communications, (1) packet communication, (2) call switching communication, and (3) voice communication, can be distinguished from each other. This identification information is added by a transmission terminal or telecommunication network. A result of the identification is displayed on the LCD 69, or shown to a user by a sound having a different frequency or strength or by other methods.

[3] Switching of the communication mode

The communication mode is switched according to the content of the received signal. When the received signal requests the packet communication, the switching of the communication mode is unnecessary, and a successively received signal is simply demodulated by the packet switching modem 82. The path for the received signal is: radio receiver 66→packet switching modem 82→input/output ports 94b→processor 90→bus 92→RAM 101.

When this received signal is to be processed in the PC, the course is: radio receiver 66→packet switching modem 82→input/output ports 94b→input/output ports 94a→PC interface→PC. It is a matter of choice in designing whether the receiving of the signal is shown to a user.

When the call switching communication is requested, the communication mode is switched to the call switching communication mode. A signal received by the radio receiver 66 is supplied to the call switching modem 80 via the received signal processing circuit 76. When the received signal requests the initiation of voice communication, this personal communication device generates a call sound. When a user makes a response, the calling terminal is informed of this response. The communication mode is switched to the call switching mode, enabling the voice communication. When the received signal requests the call switching data communication, the call switching modem 80 is made active and demodulates the received signal. The received signal is sent to the PC via the following course: call switching modem 80 input/output ports 94b→input/output ports 94a→PC interface→PC.

The first embodiment of the present invention has been described. The following modifications of this embodiment can be made:

a) As described before, a personal communication device provided by the present invention is useful, even without the call switching modem 80. Such a personal communication device is only usable in the call switching communication mode and the voice communication mode. The hardware structure of this personal communication device does not have parts related to the call switching data communication. The functions related to the call switching data communication in the control of the receiving are removed. All features other than described above are left as before.

b) Although the receiving of a signal is always awaited in the packet communication mode in this embodiment, it may also be awaited in the call switching communication mode. The identification of a received signal is carried out by cooperation of the call switching modem 80 and the modem driver. When the communication mode needs to be switched to the packet communication mode, a user may be informed by generating a call sound.

c) The packet communication may be achieved using an IP packet, E-mail, CLNP packet and so on, as well as a CDPD packet. The call switching data communication may be achieved using TDMA, CMDA, PHS, and so on, as well as AMPS.

EMBODIMENT 2

In Embodiment 1, the receiving of a personal communication device is described. In this embodiment, a personal telecommunication system including a receiving terminal (called terminal) and transmission terminal (calling terminal) is described. The target of the personal telecommunication system here is to achieve the call switching communication, especially the voice communication.

Figure 3:
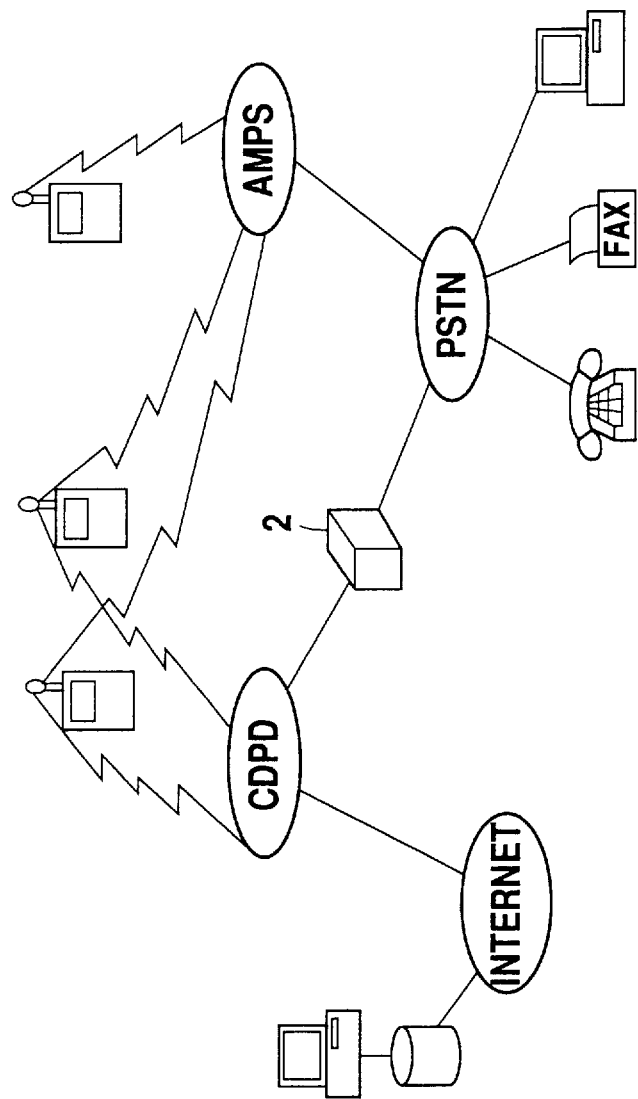
FIG. 3 shows the concept of a personal telecommunication system including a personal communication device provided by the present invention.

FIG. 3 shows the concept of a personal telecommunication system including a personal communication device provided by the present invention. As shown in FIG. 3, the AMPS network and CDPD network are connected with each other via ISDN or the like. These networks have necessary stations. PSTN is a wired system. The CDPD network is also connected to the internet. A personal communication device provided by the present invention can be used in both CDPD and AMPS networks. A conventional personal communication device is unusable in the packet communication mode, and can only be used in the AMPS network.

[Configuration 1]

Figure 4:
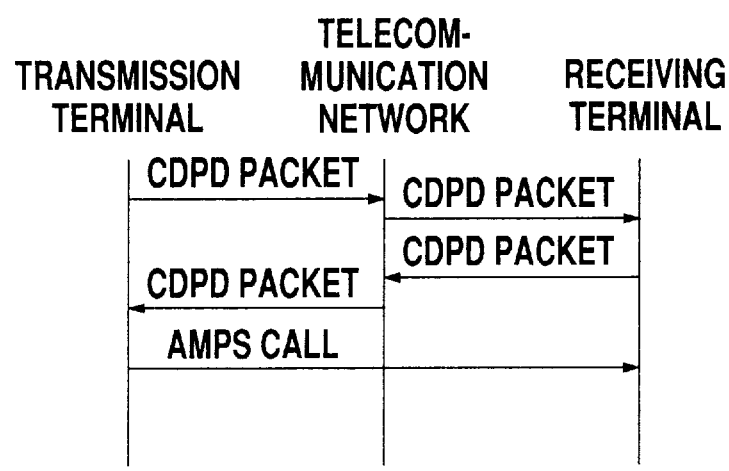
FIG. 4 shows a telecommunication procedure according to the first configuration of the second embodiment.
Figure 5:
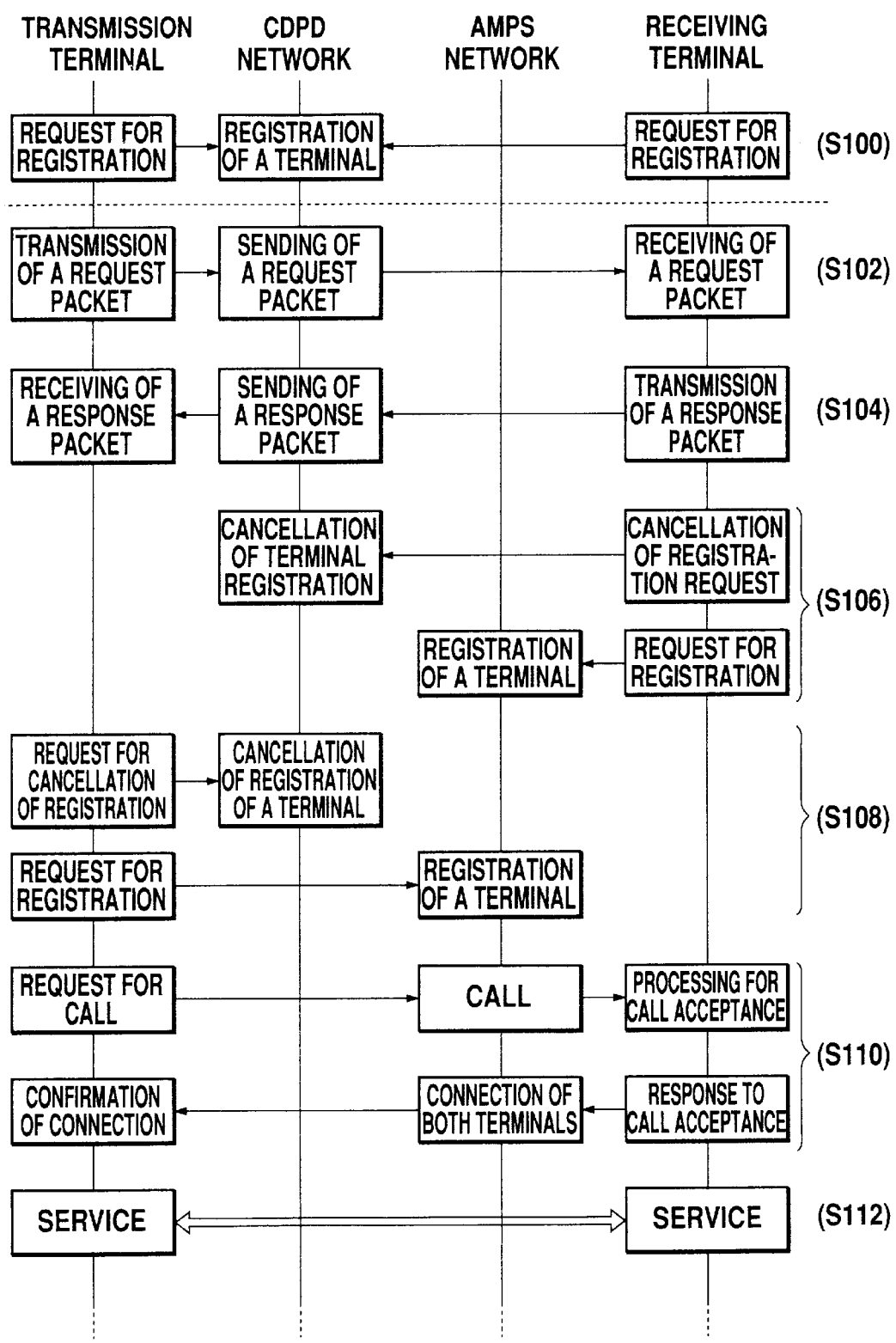
FIG. 5 shows details of the telecommunication procedure shown in FIG. 4.

FIG. 4 shows a telecommunication procedure according to the first configuration of the second embodiment. FIG. 5 shows details of the telecommunication procedure shown in FIG. 4. As shown in FIG. 4, Configuration 1 is characterized in that the transmission terminal sends a CDPD packet to the receiving terminal, and then the receiving terminal sends back a CDPD packet after confirming the CDPD packet. After the confirmation, the transmission terminal first calls in the AMPS mode. Although the voice communication itself takes place in the AMPS network at both terminals, the awaiting of receiving and initial transmission are performed only in the packet communication mode. This procedure will be described by reference to FIG. 5.

(S100) Both the transmission and receiving terminals are registered to the CDPD network. Communication in the packet communication mode is ready.

(S102) A user of the transmission terminal requests the voice communication to the receiving terminal. The user dials the receiving terminal (makes a call). The transmission terminal generates a request packet including a telephone number, i.e. IP number, which is sent to the receiving terminal via the CDPD network. The receiving terminal receives the request packet. The user is informed of the receiving of the request packet by a sound or the like.

(S104) A user of the receiving terminal makes a response, which is sent as a CDPD packet to the transmission terminal via the CDPD network.

(S106) The receiving terminal changes the communication mode to the call switching communication mode in order to achieve the voice communication. The inner circuit is switched, the registration in the CDPD network is cancelled, and then the receiving terminal is registered in the AMPS network.

(S108) The transmission terminal which has received a response packet also cancels its present registration, and is newly registered in the AMPS network. The mode is changed to the call switching communication mode.

(S110) The receiving terminal is called via the AMPS network, and processes the call. The receiving terminal makes a response to the transmission terminal, and the two terminals are connected in the AMPS network. The receiving terminal confirms the connection. This procedure is automatically controlled at each terminal upon the arrival of the request and response packets.

(S112) The usual voice communication begins.

The respective steps of the procedure have been described above. When the voice communication ends, the communication mode of both terminals is returned to the packet communication mode, and the state of the personal communication device is returned to the step S100 in FIG. 5. The following modifications of this configuration, which are also applicable to other configurations, can be made:

a) When no response is made at the step S104 (power is off, or the terminal is busy), a re-call is required. Therefore, re-calling conditions (such as intervals, times) are included in a CDPD packet in advance. The CDPD network re-calls the receiving terminal according to the re-calling conditions.

b) When no response is made at the step S104, the CDPD network stores the request packet. This request packet is sent to the receiving terminal when the receiving terminal is registered in the CDPD network. This reduces the number of re-calls.

c) Security information is added to the request packet in advance. For example, the telephone number (IP number) of the transmission terminal is added. The receiving terminal determines whether this call may be received.

[Configuration 2]

Figure 6:
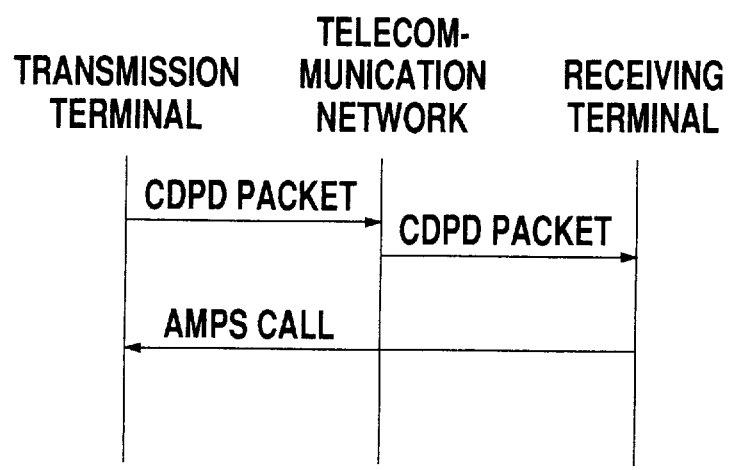
FIG. 6 shows a telecommunication procedure according to the second configuration of the second embodiment.
Figure 7:
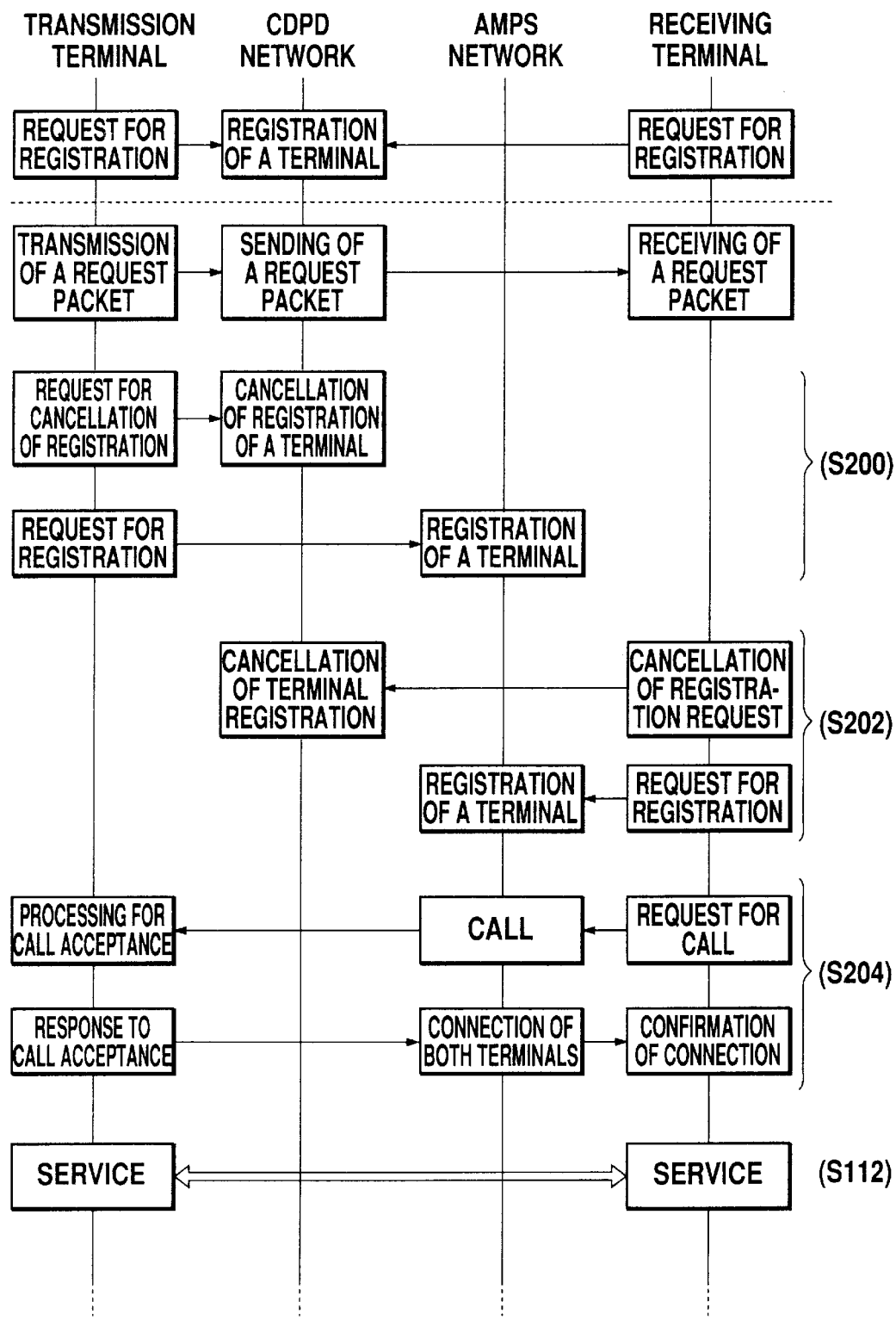
FIG. 7 shows details of the telecommunication procedure shown in FIG. 6.

FIG. 6 shows a telecommunication procedure according to the second configuration of the second embodiment. The second configuration is characterized in that the receiving terminal calls the transmission terminal in the AMPS network by itself without returning a response packet. FIG. 7 shows details of the telecommunication procedure shown in FIG. 6. Differences from FIG. 5 will be described by reference to FIG. 7.

(S200) After a request packet is sent, the communication mode of the transmission terminal automatically changes to the call switching communication mode.

(S202) The communication mode of the receiving terminal is changed to the call switching communication mode.

(S204) The receiving terminal calls the transmission terminal via the AMPS network in a conventional way. The transmission terminal processes the call, and then responds to the call. Both terminals are connected with each other in the AMPS network.

In the second configuration the receiving terminal makes a call in the reverse direction. The second configuration is more advantageous in reducing the number of steps than the first configuration. However, the communication mode becomes the call switching communication mode regardless of whether the person with whom a user talks is available. Consequently, when no response comes from the person, the communication mode of the transmission terminal needs to return to the packet communication mode, and then the transmission terminal re-calls the receiving terminal. The first configuration is advantageous in leading to almost no waiting time in the call switching communication mode.

EMBODIMENT 3

In Embodiment 2, both transmission and receiving terminals are assumed to be personal communication devices provided by the present invention. In this embodiment, a telecommunication system in which the receiving terminal is a conventional personal communication device will be described.

[Configuration 1]

Figure 8:
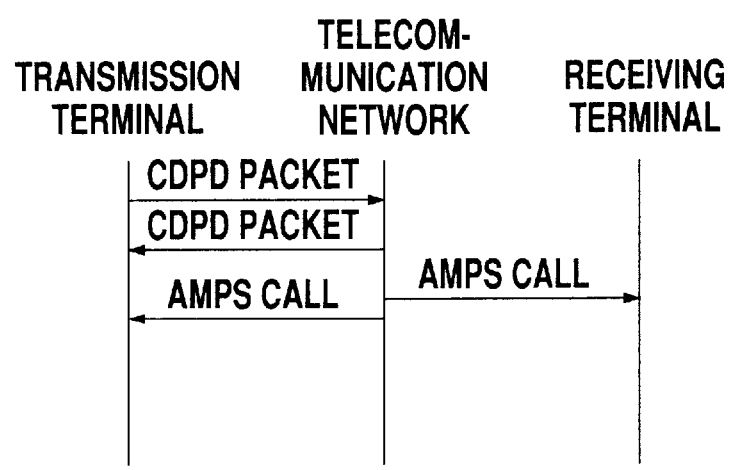
FIG. 8 shows a telecommunication procedure according to the first configuration of the third embodiment.
Figure 9:
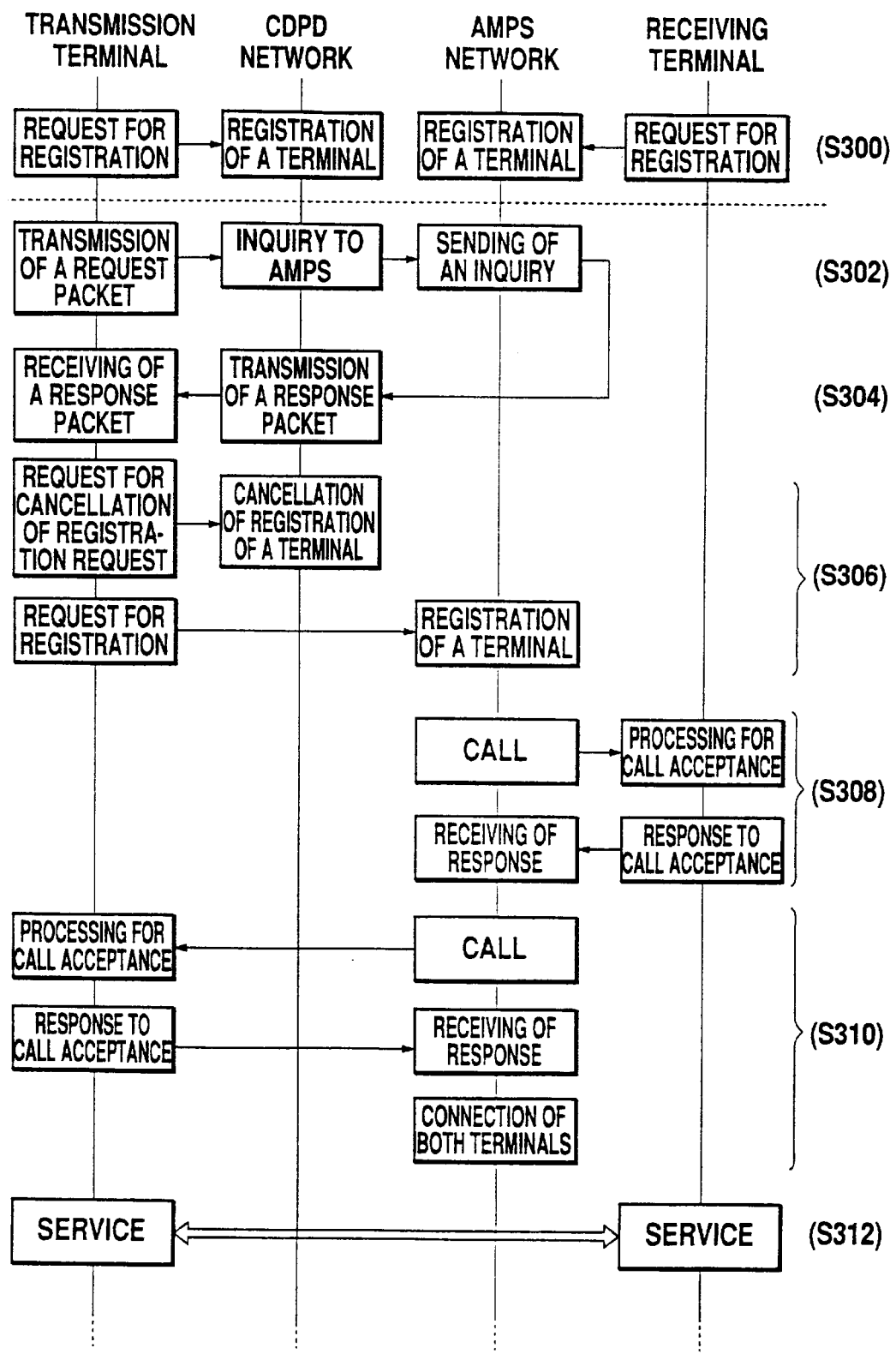
FIG. 9 shows details of the telecommunication procedure shown in FIG. 8.

FIG. 8 shows a telecommunication procedure according to the first configuration of the third embodiment. FIG. 9 shows details of the telecommunication procedure shown in FIG. 8. As shown in FIG. 8, the transmission terminal sends a CDPD packet to the receiving terminal in Configuration 1. When the CDPD network confirms that the receiving terminal is a conventional device, it generates a CDPD packet by itself, and sends back the generated CDPD packet. The communication mode of the transmission terminal is changed to the call switching communication mode. This procedure is described by reference to FIG. 9.

(S300) The transmission and receiving terminals have been registered in the CDPD and AMPS networks, respectively.

(S302) The transmission terminal sends a request packet. The CDPD network refers to a telephone number in the packet and its own data base. When the CDPD network knows that the receiving terminal is a conventional device, it inquires of the AMPS network whether the conventional device is present (registered or connected). The AMPS network replies with the presence of the conventional device (availability of communication) in response to the inquiry.

(S304) The CDPD network generates a response packet by itself, and sends it to the receiving terminal.

(S306) The transmission terminal receives the response packet, and its communication mode is changed to the call switching communication mode.

(S308) The AMPS network requests a call to the receiving terminal, and the receiving terminal processes the call and responds to the call.

(S310) The AMPS network requests a call to the transmission terminal, and the transmission terminal processes the call and responds to the call. The AMPS network connects the two terminals.

(S312) The usual voice communication begins.

The respective steps of the procedure have been described above. When the voice communication ends, the communication mode of the transmission terminal is returned to the packet communication mode. The state of the personal communication device is returned to the step S300 in FIG. 9. This configuration is characterized in that the telecommunication network makes calls on both sides. The making of calls on both sides is similarly applicable to other configurations including those in other preferred embodiments. The timing of the calls is set at the time when both terminals become ready for the call switching communication.

The following modifications of this configuration can be made:

a) When the request packet includes security information, the receiving terminal, which is conventional, cannot read the content of the request packet. Therefore, the telecommunication network (either CDPD or AMPS network) reads out the request packet, and determines whether the call should be accepted by the receiving terminal. A user of the receiving terminal needs to register conditions of the permission for receiving a telephone call to a service center in advance within a scope designatable by the security information.

b) Although the CDPD network inquires of the AMPS network in the step S302, it may have a table showing the presence of the receiving terminal (registration) in its own data base. This enables the inquiry to be unnecessary.

c) When it is found in the step S302 that the receiving terminal is not connected to the AMPS network, the CDPD network sends an "unconnection notification packet" showing that the receiving terminal is not connected, to the transmission terminal. This packet informs the user of the transmission terminal that he must wait for the connection of the receiving terminal.

d) In the case of c), the unconnection notification packet may be processed in the CDPD network without returning the unconnection notification packet to the transmission terminal. When the unconnection notification packet is returned to the CDPD network, the CDPD network automatically inquires of the AMPS network repeatedly at constant time intervals.

e) Although the AMPS network sends a request for a call to the transmission terminal at the step S310, the transmission terminal may previously request a connection to the receiving terminal from the AMPS network.

[Configuration 2]

Figure 10:
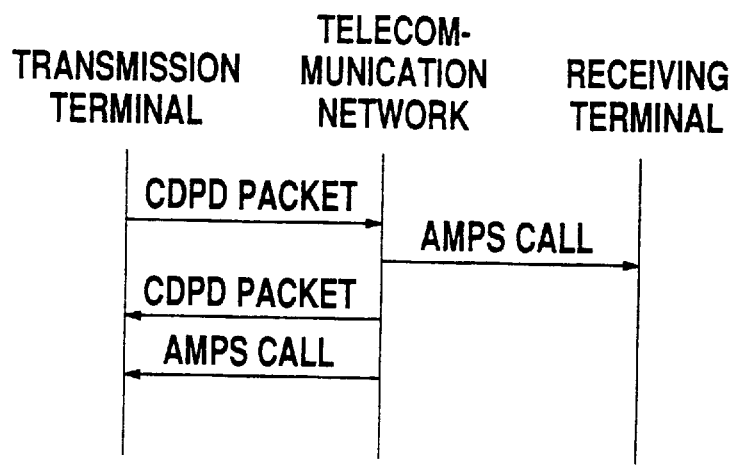
FIG. 10 shows a telecommunication procedure according to the second configuration of the third embodiment.

FIG. 10 shows a telecommunication procedure according to the second configuration of the third embodiment. In the above described Configuration 1, when the transmission terminal sends the request packet, the CDPD network first sends back the response packet. In Configuration 2, the receiving terminal is called in the AMPS network before sending back the response packet. The details of Configuration 2 are realized by changing the sequence of S304, S306 and S308 to that of S308, S304 and S306 in FIG. 9. After confirming the processing for a call and response thereto carried out by the receiving terminal, the CDPD network sends the response packet. This enables the communication mode of the transmission terminal to be changed to the call switching communication mode only when necessary.

EMBODIMENT 4

In contrast to Embodiment 3, the transmission terminal is a conventional device, and the receiving terminal is a personal communication device provided by the present invention in this preferred embodiment. A personal telecommunication system according to this embodiment will be described.

[Configuration 1]

Figure 11:
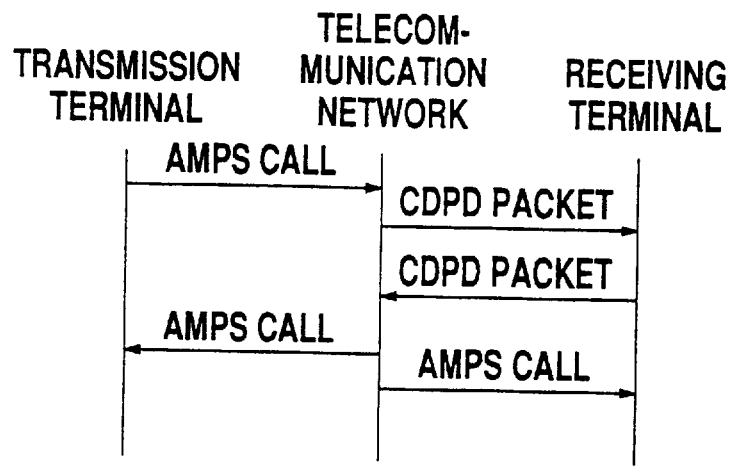
FIG. 11 shows a telecommunication procedure according to the first configuration of the fourth embodiment.
Figure 12:
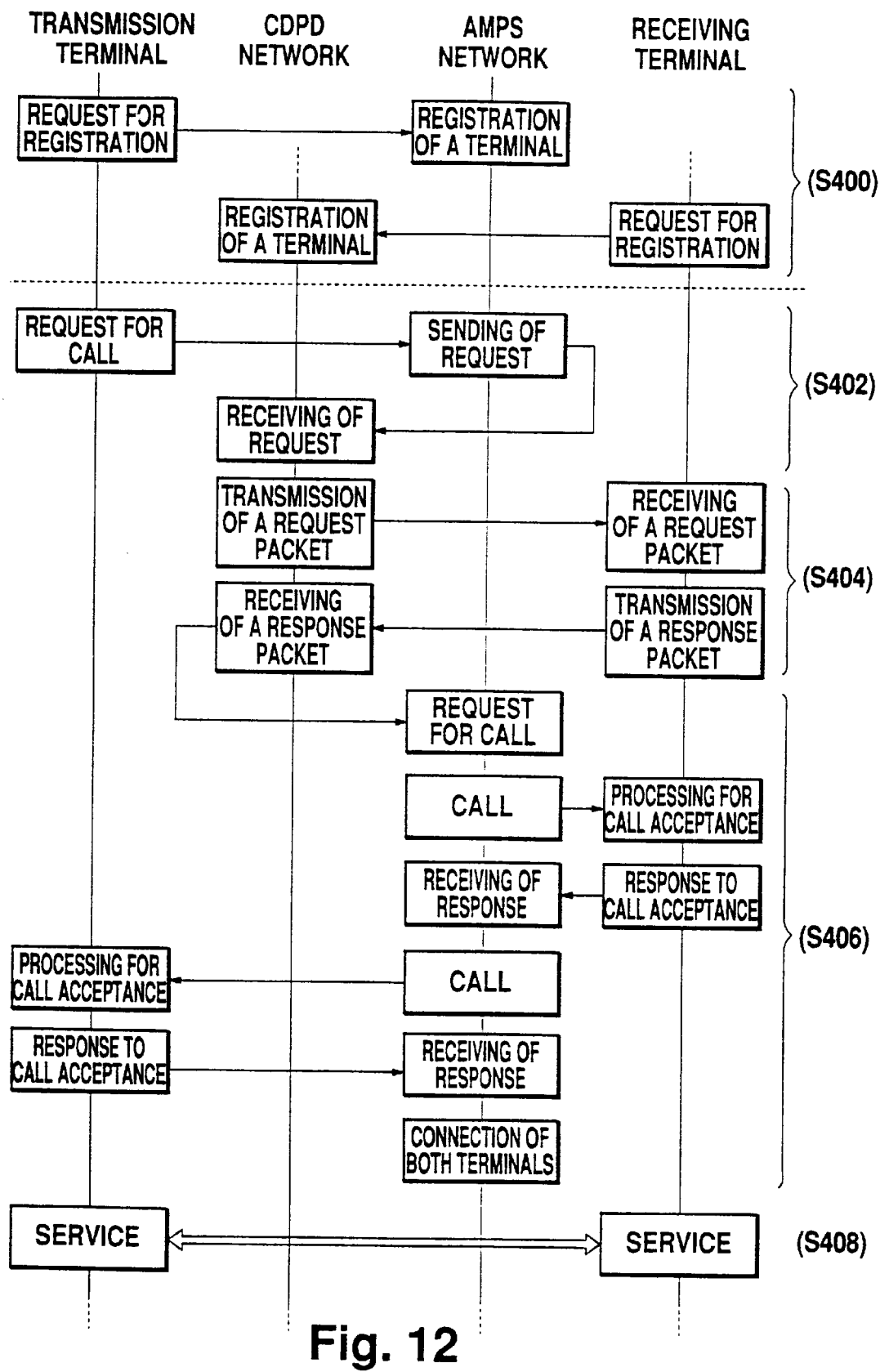
FIG. 12 shows details of the telecommunication procedure shown in FIG. 11.

FIG. 11 shows a telecommunication procedure according to the first configuration of the fourth embodiment. FIG. 12 shows details of the telecommunication procedure shown in FIG. 11. As shown in FIG. 11, this preferred embodiment is characterized in that the transmission terminal first requests a call in the AMPS network, and then the CDPD network which has received the request for a call generates a request packet to send to the receiving terminal. This procedure will be described by reference to FIG. 12.

(S400) The transmission and receiving terminals have been registered in the AMPS and CDPD networks, respectively.

(S402) The transmission terminal sends a request for a call to the AMPS network, and the AMPS network refers to its own data base. When the receiving terminal is known to be present in the CDPD network, the request for a call is sent to the CDPD network.

(S404) The CDPD network generates a request packet by itself, and sends it to the receiving terminal. The communication mode of the receiving terminal is changed to the call switching communication mode after receiving the request for a call, and then a response packet is sent to the CDPD network.

(S406) The CDPD network requests a call to the AMPS network. The AMPS network calls both terminals. Both terminals process the call, and respond to the call. The AMPS network connects the terminals with each other.

(S408) The usual voice communication begins.

The respective steps of the procedure have been described above. When the voice communication ends, the communication mode of the receiving terminal is returned to the packet communication mode. The state of the personal communication device is returned to the step S400 in FIG. 11.

In this configuration, the CDPD network refers to information such as the telephone number of the transmission terminals, and puts the security information into the request packet.

[Configuration 2]

Figure 13:
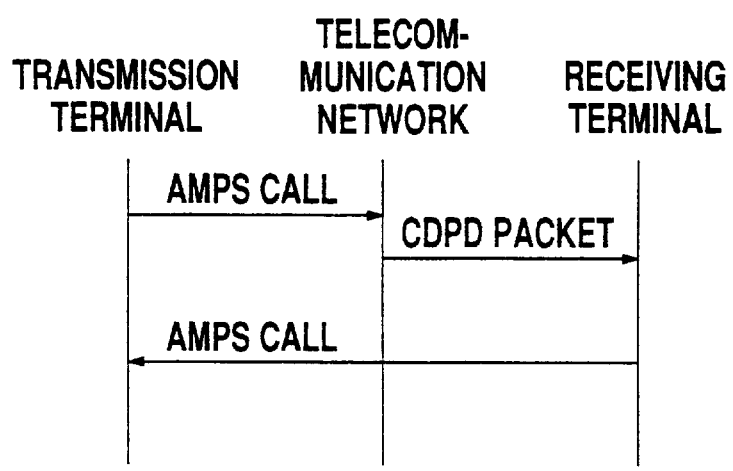
FIG. 13 shows a telecommunication procedure according to the second configuration of the fourth embodiment.

FIG. 13 shows a telecommunication procedure according to the second configuration of the fourth embodiment. Although the receiving terminal sends back the response packet to the CDPD network in Configuration 1, the receiving terminal directly calls the transmission terminal in the AMPS network in Configuration 2. The details of this procedure will easily be understood by the previous descriptions.

Preferred embodiments of the personal telecommunication system provided by the present invention have been described above.

While there has been described what are at present considered to be preferred embodiments of the present invention, it will be understood that various modifications may be made thereto, and it is intended that the appended claims cover all such modifications that fall within the true spirit and scope of the present invention.

I claim:

1. A personal telecommunication system comprising a transmission terminal, a receiving terminal and a telecommunication network, wherein the transmission terminal is a personal communication device, the personal communication device including:

a call switching communication section for providing a call switching communication mode, as a first of two communication modes, including voice communication, according to a call switching telecommunication method, a packet communication section for providing a packet communication mode, as a second of the two communication modes, utilizing the telecommunication network, a radio communication section commonly used in two communication modes, and a synthetical control section for synthetically controlling the two communication modes, the synthetical control section having a current communication mode, fixedly awaiting a reception in only one of the two communication modes and changing the current communication mode into the other of the two communication modes according to the content of a signal received in the current communication mode;

the receiving terminal is a personal communication device usable in only the call switching communication mode, and the transmission terminal first sends a request packet for initiating call switching communication to the network in the packet communication mode, and the network makes a call to the receiving terminal in the call switching mode after receiving the request packet.

2. A personal telecommunication system in accordance with claim 1, wherein the transmission terminal automatically changes its current communication mode into the call communication mode after sending the request packet to the telecommunication network.

3. A personal telecommunication system in accordance with claim 1, wherein the transmission terminal awaits in the packet communication mode after sending the request packet to the telecommunication network, the telecommunication network makes a call to the receiving terminal in the call switching communication mode and sends the response packet to the transmission terminal after the receiving terminal responds to the call, and the transmission terminal changes its current communication mode into the call switching mode when receiving the response packet.

4. A personal telecommunication system comprising a transmission terminal, a receiving terminal and a telecommunication network, wherein the transmission terminal is a personal communication device usable in only the call switching communication mode, the receiving terminal is a personal communication device, the personal communication device including:

a call switching communication section for providing a call switching communication mode, as a first of two communication modes, including voice communication, according to a call switching telecommunication method, a packet communication section for providing a packet communication mode, as a second of the two communication modes, utilizing the telecommunication network, a radio communication section commonly used in two communication modes, and a synthetical control section for synthetically controlling the two communication modes, the synthetical control section having a current communication mode, fixedly awaiting a reception in only one of the two communication modes and changing the current communication mode into the other of the two communication modes according to the content of a signal received in the current communication mode; and, when the transmission terminal makes a call to the receiving terminal, the telecommunication network converts the call to a request packet for initiating call switching communication, and then sends the request packet to the receiving terminal in the packet communication mode.

5. A personal telecommunication system in accordance with claim 4, wherein the receiving terminal sends a response packet for initiating call switching communication to the telecommunication network after receiving the request packet and changes its current communication mode into the call switching communication mode, and the telecommunication network makes a call to the transmission terminal in the call switching communication mode after receiving the response packet.

6. A personal telecommunication system including a transmission terminal, a receiving terminal and a telecommunication network, wherein the transmission and receiving terminals are usable in both packet communication mode and call switching communication mode, and the telecommunication network converts a signal between the transmission and receiving terminals when their communication modes are different form each other.

7. A personal telecommunication system comprising:

a transmission terminal having one of a plurality of personal communication devices;

a receiving terminal having another of the plurality of personal communication devices; and a telecommunication network for communication with the transmission and receiving terminals, each of the personal communication devices including:

a call switching communication section for providing a call switching communication mode, as a first of two communication modes, including voice communication, according to a call switching telecommunication method, a packet communication section for providing a packet communication mode, as a second of the two communication modes, utilizing the telecommunication network, a radio communication section commonly used in two communication modes, and a synthetical control section for synthetically controlling the two communication modes, the synthetical control section having a current communication mode, fixedly awaiting a reception in only one of the two communication modes and changing the current communication mode into the other of the two communication modes according to the content of a signal received in the current communication mode, wherein the transmission terminal first sends a request packet for initiating call switching communication to three receiving terminal in the packet communication mode, the receiving terminal changes its current communication mode into the call switching communication mode after receiving the request packet, the receiving terminal sends a response packet for initiating call switching communication to the transmission terminal in the call switching mode and changes its current communication mode into the call switching communication mode after receiving the request packet, and the transmission terminal changes its current communication mode into the call switching communication mode after receiving the response packet.

8. A personal telecommunication system comprising:

a transmission terminal having one of a plurality of personal communication devices;

a receiving terminal having another of the plurality of personal communication devices; and a telecommunication network for communication with the transmission and receiving terminals, each of the personal communication devices including:

a call switching communication section for providing a call switching communication mode, as a first of two communication modes, including voice communication, according to a call switching telecommunication method, a packet communication section for providing a packet communication mode, as a second of the two communication modes, utilizing the telecommunication network, a radio communication section commonly used in two communication modes, and a synthetical control section for synthetically controlling the two communication modes, the synthetical control section having a current communication mode, fixedly awaiting a reception in only one of the two communication modes and changing the current communication mode into the other of the two communication modes according to the content of a signal received in the current communication mode, wherein the transmission terminal first sends a request packet for initiating call switching communication to the receiving terminal in the packet communication mode, the receiving terminal changes its current communication mode into the call switching communication mode after receiving the request packet, the transmission terminal automatically changes its current communication mode into the call switching communication mode after sending the request packet and the receiving terminal changes its current communication mode into the call switching communication mode after sending the response packet and then makes a call to the transmission terminal.

9. A personal telecommunication system comprising:

a transmission terminal having one of a plurality of personal communication devices;

a receiving terminal having another of the plurality of personal communication devices; and a telecommunication network for communication with the transmission and receiving terminals, each of the personal communication devices including:

a call switching communication section for providing a call switching communication mode, as a first of two communication modes, including voice communication, according to a call switching telecommunication method, a packet communication section for providing a packet communication mode, as a second of the two communication modes, utilizing the telecommunication network, a radio communication section commonly used in two communication modes, and a synthetical control section for synthetically controlling the two communication modes, the synthetical control section having a current communication mode, fixedly awaiting a reception in only one of the two communication modes and changing the current communication mode into the other of the two communication modes according to the content of a signal received in the current communication mode, wherein the transmission terminal first sends a request packet for initiating call switching communication to three receiving terminal in the packet communication mode, the receiving terminal changes its current communication mode into the call switching communication mode after receiving the request packet, and the network makes a call to both the transmission and receiving terminals in the call switching communication mode when both the transmission and receiving terminals become available for communication,.

10. A personal telecommunication system comprising:

a transmission terminal having one of a plurality of personal communication devices;

a receiving terminal having another of the plurality of personal communication devices; and a telecommunication network for communication with the transmission and receiving terminals, each of the personal communication devices including:

a call switching communication section for providing a call switching communication mode, as a first of two communication modes, including voice communication, according to a call switching telecommunication method, a packet communication section for providing a packet communication mode, as a second of the two communication modes, utilizing the telecommunication network, a radio communication section commonly used in two communication modes, and a synthetical control section for synthetically controlling the two communication modes, the synthetical control section having a current communication mode, fixedly awaiting a reception in only one of the two communication modes and changing the current communication mode into the other of the two communication modes according to the content of a signal received in the current communication mode, wherein the transmission terminal first sends a request packet for initiating call switching communication to three receiving terminal in the packet communication mode, the receiving terminal changes its current communication mode into the call switching communication mode after receiving the request packet, the request packet includes security information, and the security information is referred to in order to judge whether sharing requested communication is allowable.

11. A personal telecommunication system comprising:

a transmission terminal having one of a plurality of personal communication devices;

a receiving terminal having another of the plurality of personal communication devices; and a telecommunication network for communication with the transmission and receiving terminals, each of the personal communication devices including:

a call switching communication section for providing a call switching communication mode, as a first of two communication modes, including voice communication, according to a call switching telecommunication method, a packet communication section for providing a packet communication mode, as a second of the two communication modes, utilizing the telecommunication network, a radio communication section commonly used in two communication modes, and a synthetical control section for synthetically controlling the two communication modes, the synthetical control section having a current communication mode, fixedly awaiting a reception in only one of the two communication modes and changing the current communication mode into the other of the two communication modes according to the content of a signal received in the current communication mode, wherein the transmission terminal first sends a request packet for initiating call switching communication to three receiving terminal in the packet communication mode, the receiving terminal changes its current communication mode into the call switching communication mode after receiving the request packet, the request packet includes re-calling conditions, and the network makes another call to the receiving terminal according to the re-calling conditions when the receiving terminal is not available for receiving.

12. A method for communicating within a personal telecommunication system having a transmission terminal, a receiving terminal and a telecommunication network, wherein the transmission and receiving terminals are usable in both packet communication mode and call switching communication mode, the method comprising the steps of:

sending a request packet for initiating call switching communication from the transmission terminal to the receiving terminal in the packet communication mode;

changing a current communication mode of the receiving terminal into the call switching communication mode after receiving the request packet; and converting a signal between the transmission and receiving terminals with the telecommunication network when the communication modes of the transmission and receiving terminals are different from each other.

* * * * *